(12) United States Patent
Sun (10) Patent No.: US 11,365,056 B2
(45) Date of Patent: Jun. 21, 2022

(54) CONVEYING DEVICE (71) Applicant: SUZHOU SUXIANG ROBOT INTELLIGENT EQUIPMENT CO., LTD, Jiangsu (CN)

(72) Inventor: Lining Sun, Jiangsu (CN)

(73) Assignee: SUZHOU SUXIANG ROBOT INTELLIGENT EQUIPMENT CO., LTD, Jiangsu (CN)

( * ) Notice: Subject to any disclaimer, the term of this patent is extended or adjusted under 35 U.S.C. 154(b) by 0 days.

(21) Appl. No.: 17/422,258

(22) PCT Filed: Jan. 18, 2020

(86) PCT No.: PCT/CN2020/072897
§ 371 (c)(1),
(2) Date: Jul. 12, 2021

(87) PCT Pub. No.: WO2020/147851
PCT Pub. Date: Jul. 23, 2020

(65) Prior Publication Data
US 2022/0081222 A1 Mar. 17, 2022

(30) Foreign Application Priority Data

Jan. 20, 2019 (CN) .......................... 201910050764.4
Jan. 20, 2019 (CN) .......................... 201910050766.3
(Continued)

(51) Int. Cl.
*B65G 47/46* (2006.01)
*B65G 47/64* (2006.01)
*B65G 13/10* (2006.01)

(52) U.S. Cl.
CPC ............. *B65G 13/10* (2013.01); *B65G 47/46* (2013.01); *B65G 47/64* (2013.01); *B65G 2207/34* (2013.01)

(58) Field of Classification Search
CPC ......... B65G 47/64; B65G 13/10; B65G 47/46
See application file for complete search history.

(56) References Cited

U.S. PATENT DOCUMENTS 1,758,603 A * 5/1930 Helenbolt ............... B07B 13/04
209/701
4,878,578 A 11/1989 Brouwer
(Continued)

FOREIGN PATENT DOCUMENTS

CN 1525889 A 9/2004
CN 101678959 A 3/2010
(Continued)

*Primary Examiner* — Gene O Crawford
*Assistant Examiner* — Lester Rushin, III
(74) *Attorney, Agent, or Firm* — Hudak, Shunk & Farine Co. LPA (57) ABSTRACT

A conveying device including a frame, a transportation channel, and a branch conveying mechanism, the transportation channel and the branch conveying mechanism are driven by their respective driving units, and the transportation channel is provided with a number of rows of regular rollers, or at least a conveyor belt, or a combination of regular rollers and a conveyor belt, the branch conveying mechanism includes at least one group of irregular rollers, when the irregular roller rotates, the highest point of a top of the roller is higher than an upper surface of an adjacent transportation channel during the rotation, and the lowest place of a top horizontal plane of the roller is lower than the upper surface of the adjacent transportation channel; when the irregular roller does not rotate, the top of the roller substantially stops at the lowest place of the top horizontal plane of the roller during rotation; the transportation channel and the branch conveying mechanism are provided alternately.

6 Claims, 9 Drawing Sheets

(30) Foreign Application Priority Data

Jan. 20, 2019 (CN) .......................... 201910050767.8
Jan. 20, 2019 (CN) .......................... 201910050771.4

(56) References Cited

U.S. PATENT DOCUMENTS

| | | |
|---|---|---|
| 5,238,099 A | 8/1993 | Schroeder et al. |
| 6,073,747 A | 6/2000 | Takino et al. |
| 11,279,562 B2 * | 3/2022 | Ward .................. B65B 57/14 |
| 2016/0023848 A1 | 1/2016 | Fourney |
| 2020/0108414 A1 * | 4/2020 | Sturm .................. B65G 47/71 |
| 2022/0041321 A1 * | 2/2022 | Amend, Jr. .......... G06Q 10/087 |

FOREIGN PATENT DOCUMENTS

| | | | |
|---|---|---|---|
| CN | 108082833 A | | 5/2018 |
| DE | 102010044239 A1 | | 10/2011 |
| KR | 2022022004 A | * | 2/2022 |

* cited by examiner

CONVEYING DEVICE

FIELD OF THE INVENTION

The invention relates to a conveying device, which is mainly used for logistics sorting and object transportation on a production line.

BACKGROUND OF THE INVENTION

At present, due to increase in labor costs, it is of great significance to replace humans with machines. Among them, automatic conveying devices have become a research hotspot for domestic and foreign technical personnel. A prominent example can be found at: http://www.sohu.com/a/142945825_276499, http://blog.sina.com.cn/s/blog_70270cb10102wmm0.html, wherein the structure is complex, with high cost, and in operation, the energy consumption is high.

SUMMARY OF THE INVENTION

The present invention designs a conveying device, which is simple in structure, low cost, easy to disassemble, replaceable, and with high sorting efficiency. It can be used to make intelligent sorting systems or intelligent production lines.

The present invention is designed as follows: a conveying device comprising a frame, a transportation channel, and a branch conveying mechanism, the transportation channel and the branch conveying mechanism are driven by their respective driving units, and the transportation channel is provided with a number of rows of regular rollers, or at least a conveyor belt, or a combination thereof, wherein the branch conveying mechanism includes at least one group of irregular rollers, each group of the irregular rollers includes at least one row of the irregular rollers, and the roller axles of the irregular rollers are provided on the frame via a roller axle support system, the cross-section of the irregular roller perpendicular to a rotation center line of the irregular roller is non-circular or eccentric, and the non-circular cross-section is substantially an ellipse, a regular polygon or another shape; a rotation center line of the eccentric cross-section does not pass through its center; when the irregular roller rotates, the highest point of a top of the roller is higher than an upper surface of an adjacent transportation channel during the rotation, and the lowest place of a top horizontal plane of the roller is lower than the upper surface of the adjacent transportation channel; when the irregular roller does not rotate, the top of the roller substantially stops at the lowest place of the top horizontal plane of the roller during the rotation; the transportation channel and the branch conveying mechanism are arranged alternately, and the transportation channel is not parallel to rotation center lines of rollers of the branch conveying mechanism.

In one transportation channel of the conveying device, the regular rollers provide a transportation direction which is substantially the same with that provided by the conveyor belt, the irregular rollers of the branch conveying mechanism provides a transportation direction which is perpendicular to the transportation direction of the conveyor belt or the regular rollers of an adjacent transportation channel, the irregular rollers have rotation center lines which are perpendicular to rotation center lines of the regular rollers.

The conveying device further includes driving units; the irregular rollers, the regular rollers or the conveyor belt can be driven by their respective driving units; one driving unit drives one or more rows of transportation rollers or one or more conveyor belts.

In the conveying device, one branch conveying mechanism is arranged alternately with one transportation channel.

In the conveying device, two branch conveying mechanisms are arranged alternately with one transportation channel.

In one transportation channel of the conveying device, a plurality of conveyor belts are parallel to each other, and the highest point of each regular roller and the upper surface of each conveyor belt are in the same plane.

Compared with the existing sorting and conveying devices, the conveying device provided by the present invention has the following advantages: It uses a combination of a plurality of irregular rollers and regulars rollers or a conveyor belt, and is with a simple structure, flexible movement, and low production cost; a wide range of goods can be sorted, and the sorting and transportation are smooth; it can be driven by ordinary DC motors and thus is with low manufacturing cost.

BRIEF DESCRIPTION OF THE DRAWINGS

FIG. 4 is a schematic structural diagram of location arrangements of the irregular roller of the present invention, in which FIG. 4(a) is a schematic diagram showing that the irregular roller is provided directly on a roller axle, and FIG. 4(b) is a schematic diagram showing that the irregular roller is provided on a roller axle via a sleeve and bearing.

FIG. 5 is a schematic structural diagram of the irregular roller and conveyor belt of the present invention, in which FIG. 5(a) is a front view, FIG. 5(b) is a top view, and FIG. 5(c) is a cross-sectional view.

FIG. 6 is a schematic structural diagram of the location arrangements of the transportation rollers of the present invention, in which FIG. 6(a) is a schematic diagram showing the transportation rollers are provided directly on the roller axles, and FIG. 6(b) is a schematic diagram showing that the transportation rollers are provided on the roller axles via sleeves and bearings.

FIG. 7 is a schematic structural diagram of transportation rollers with transportation rollers of the present invention, in which FIG. 7(a) is a front view, FIG. 7(b) is a top view, and FIG. 7(c) is a cross-sectional view.

FIG. 8 is a diagram showing the locations of rotation of two groups of transportation rollers in the sorting module of the present invention, in which FIG. 8(a) shows the rotation center lines of the regular rollers and the rotation center lines of the irregular rollers are in the same horizontal plane, and FIGS. 8(b) and 8(c) show the rotation center lines of two irregular rollers are in the same horizontal plane; FIG. 8(d) shows that the rotation center lines of the regular rollers and the irregular roller are not in the same horizontal plane.

FIG. 9 are schematic structural diagrams of two embodiments of the conveying mechanism of the present invention, in which FIG. 9(a) is a schematic structural diagram of one embodiment, and FIG. 9(b) is a schematic structural diagram of the other embodiment.

DETAILED DESCRIPTION OF THE INVENTION

The conveying device comprises a frame 100, a transportation channel, and a branch conveying mechanism. The transportation channel and the branch conveying mechanism are driven by their respective driving units. The transportation channel is provided with a number of rows of regular rollers 312 or at least one conveyor belt 5, or a combination of regular rollers 312 and conveyor belt 5, wherein the branch conveying mechanism includes at least one group of irregular rollers 31, each group of irregular rollers include at least one row of irregular rollers, and the roller axles 32 of the irregular rollers 31 are provided on the frame 100 via a roller axle support system 101. The cross-section of the irregular roller 31 perpendicular to the rotation center line is non-circular or eccentric. The non-circular cross-section is substantially an ellipse, a regular polygon or another shape. The rotation center line of the eccentric cross-section does not pass through its center. When the irregular roller rotates, the highest point of a top of the roller is higher than the upper surface of the adjacent transportation channel during the rotation, and the lowest place of a top horizontal plane of the roller is lower than the upper surface of the adjacent transportation channel. When the irregular roller does not rotate, the top of the roller substantially stops at the lowest place of the top horizontal plane of the roller during the rotation. The transportation channel and the branch conveying mechanism are arranged alternately. The transportation channel is not parallel to the rotation center lines of the rollers of the branch conveying mechanism. They are generally perpendicular to each other, but not limited thereto.

Figure 3:
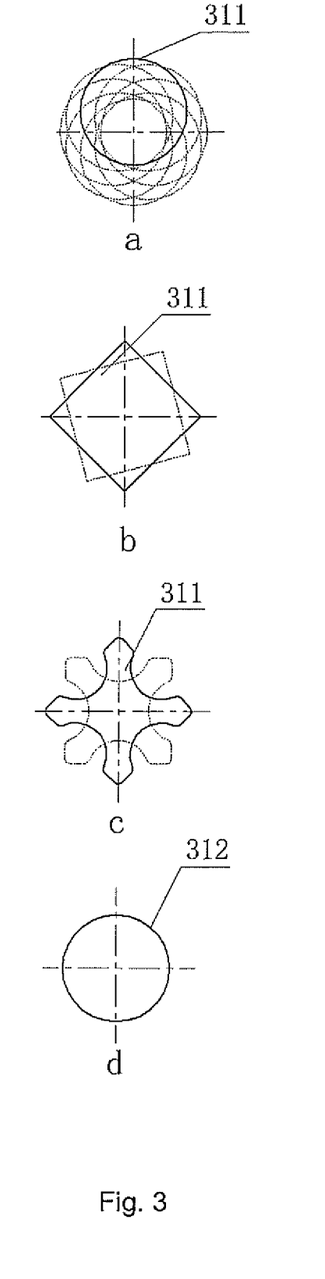
FIG. 3 is a schematic cross-sectional view of an irregular roller of the present invention.

The regular rollers and the irregular rollers are generally column rollers, and the cross-section of the irregular roller perpendicular to the rotation center line is non-circular (substantially an ellipse, a regular polygon (can be partially rounded) or another shape, or eccentric (the rotation center line does not pass through the center of the circle), as shown in FIGS. 3 (a), (b), (c). The cross-section of the regular roller perpendicular to the rotation center line is a circle, and the rotation center line passes through the center of the section. The regular roller can be a cylindrical roller, as shown in FIG. 3(d). Each group of transportation rollers includes at least one row of transportation rollers, and each row includes at least one transportation roller.

The frame 100 includes a roller axle support system 101 and a driving unit support system. The conveying device may also include a roller axle 32, a bearing 33, and a driving unit 34 (the conveying device itself includes a driving unit). The transportation channel has at least one sorting outlet or inlet 90, and the sorting outlet or inlet 90 can be located at one end or one side of the transportation channel.

Generally, the rotation center lines of the irregular rollers 31 in the same row are in a straight line, and the spacing between adjacent irregular rollers 31 in the same row is generally constant.

The edges of irregular roller 31 can be rounded, or the irregular roller can be covered with a rubber skin, or knurls (a rolled pattern) can be formed on the surface of the irregular roller to increase friction of the irregular roller against an object. The rotation center lines of all irregular rollers 31 are generally in the same plane. The conveying direction of irregular roller 31 is perpendicular to the rotation center line of irregular roller 31.

Figure 4:
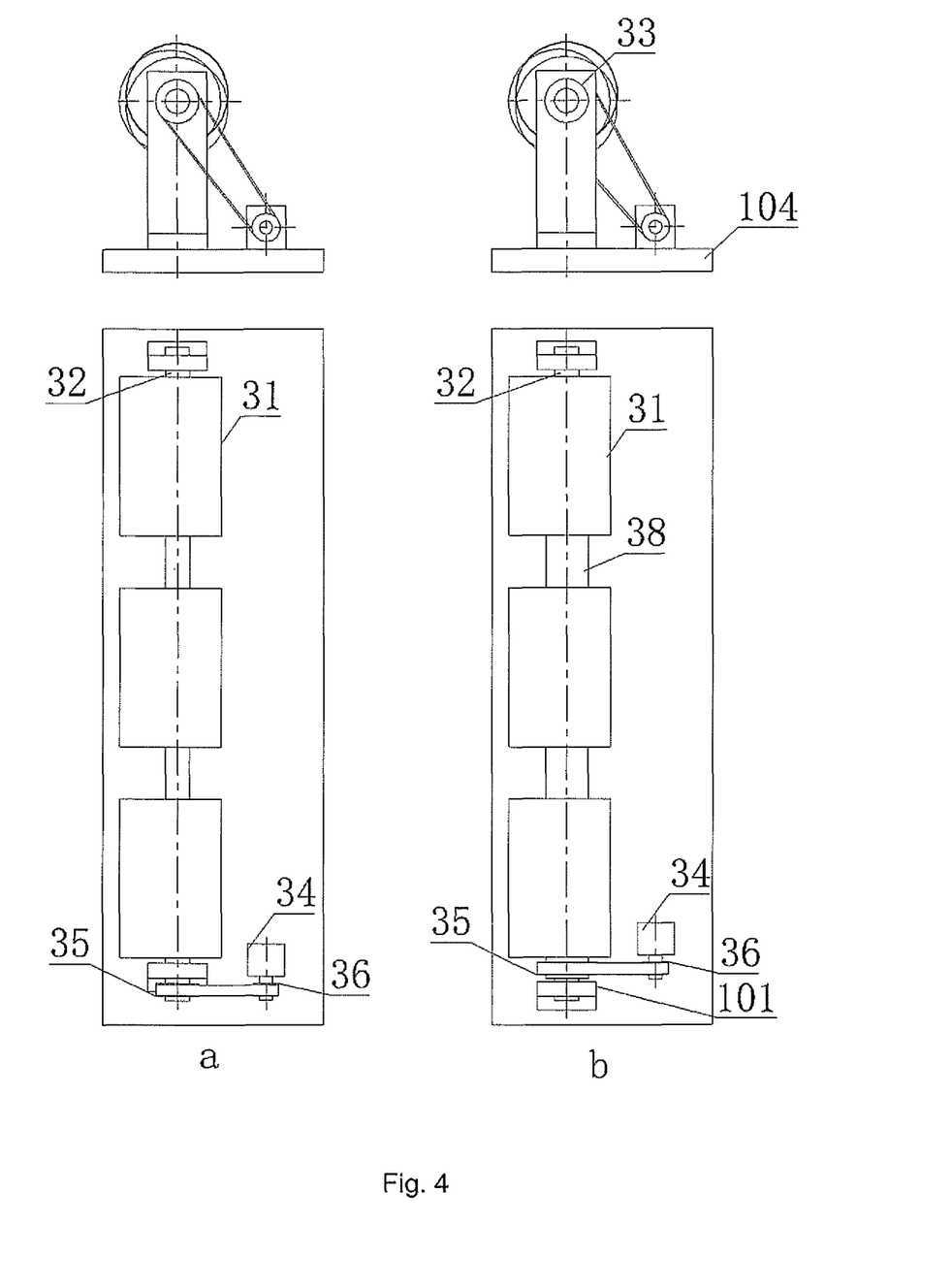
Figure 6:
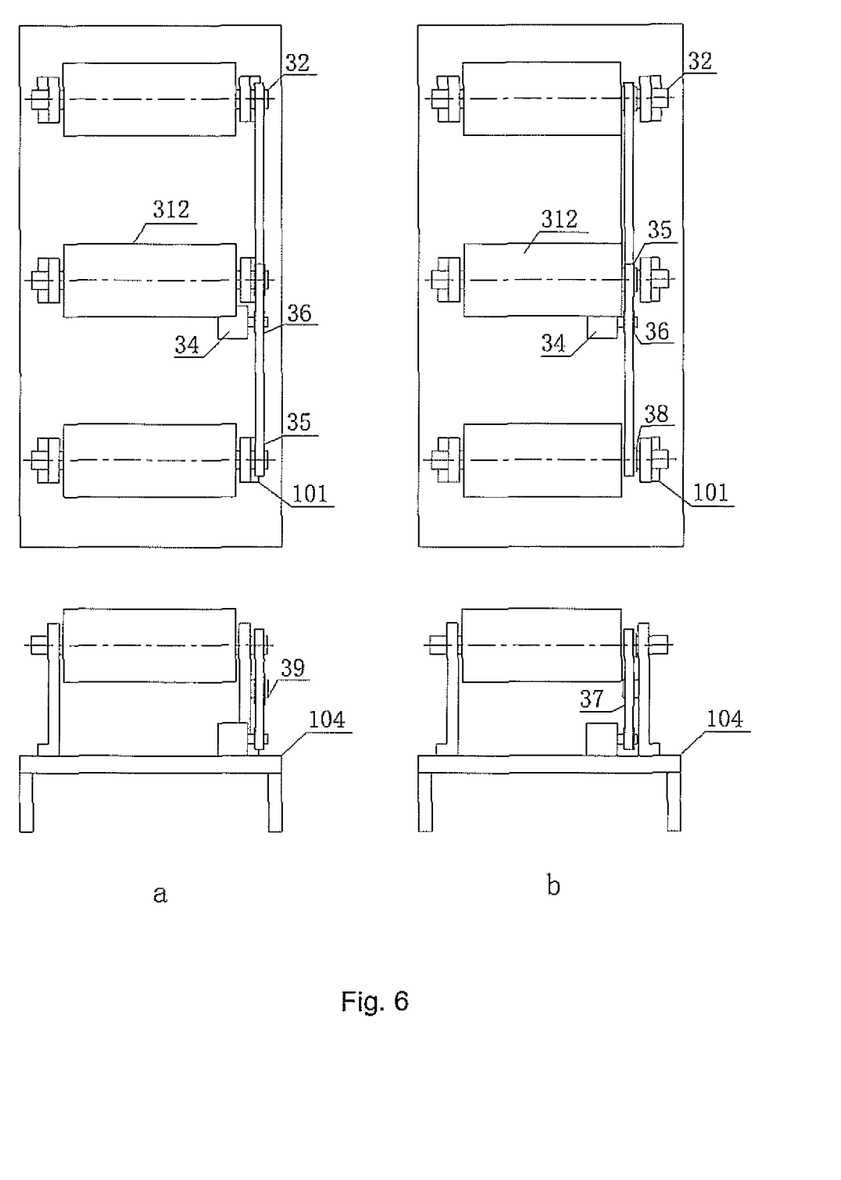

A row of irregular rollers 31 can be provided on one or more roller axles 32. As shown in FIGS. 4 and 6, roller axles 32 can be provided on the roller axle support system 101 of the frame 100 via bearings 33. As shown in FIGS. 4 and 6 (a), the roller axle 32 can also be provided with a conveyor pulley or gear 35, and a driving unit 34 can be connected to the conveyor belt wheel or gear 35 on the roller axle 32 via a conveyor belt, a gear or a link chain 36. The driving unit 34 drives the roller axle 32 to rotate, and then brings the irregular roller 31 on the roller axle 32 to rotate; the driving unit 34 is located under the irregular roller 31. Alternatively, the roller axle 32 can be directly connected with the driving unit 34 via a coupling, and the rotation of the driving unit 34 brings the roller axle 32 to rotate, and then the rotation of the roller axle 32 brings the irregular roller 31 on the roller axle 32 to rotate; the driving units 34 is located at one end of the roller axle 32. Or, an intermediate transmission shaft 37 (at least one, as shown in FIG. 6(b)), is included in the conveying device, and the intermediate transmission shaft 37 is respectively connected to a plurality of roller axles 32 and a driving unit 34 via a belt transmission or a gear transmission, among others. The driving unit 34 drives the intermediate transmission shaft 37, and then drives the roller axle to rotate and the rotation of the roller axle 32 brings the irregular roller 31 to rotate; the driving unit 34 is located under the irregular roller 31, and the driving unit is provided on the driving unit support system of the frame 100.

A row of irregular rollers 31 can be provided on one or more bearings 33, or on one or more sleeves 38. The bearings 33 are provided on the roller axle 32, or the sleeves 38 are provided on the roller axle 32 via bearings 33. The roller axle 32 is provided on the roller axle support system 101 of the frame 100. As shown in FIGS. 4 and 6(b), the bearing 33 or sleeve 38 provided with irregular roller 31 can also be provided with at least one gear or conveyor pulley 35, and the gear or conveyor pulley 35 on the gear or sleeve 38 is connected with the driving unit 34. The driving unit 34 drives the gear to rotate and then brings the irregular roller 31 to rotate. Alternatively, an intermediate transmission shaft 37 is included in the conveying device, and the intermediate transmission shaft 37 is connected respectively with the gears or pulleys on a plurality of bearings 33 and a driving unit 34 via belt transmission or gear transmission. The driving unit 34 drives the intermediate transmission shaft 37 and then brings the gears or pulleys on the bearings 33 to rotate. The rotation of the gear or pulley brings the rollers 31 on the same bearing to rotate; the driving unit 34 is located under the two groups of transportation rollers, and the driving unit 34 is provided on the driving unit support system of the frame 100.

A row of irregular rollers 31 can also be directly provided on a motor shaft. A row of irregular rollers can be provided on one or more motor shafts. The motor is provided on the roller axle support system 101 of the frame 100. The rotation of the motor drives the irregular rollers 31 to rotate.

The driving unit 34 of the conveying device can be in a common mode such as a motor drive, a pneumatic drive or a hydraulic drive. The transmission modes for driving two groups of transportation rollers can also be different, which can be gear transmission, belt transmission, chain transmission or worm gear transmission, or other commonly used transmission modes. Different components, such as motors, pulleys, gears, worm gears and worms may be provided for different transmission modes. When a belt transmission is used, a tensioning mechanism 39 may be provided on the conveyor belt to relieve slipping of the conveyor belt during transmission. The driving unit 34 may include a motor and a pulley.

When one irregular roller 31 is provided on a roller shaft 32, the irregular roller 31 is provided at the center of the roller axle 32; when there are two irregular rollers 31 on a roller axle 32, the two irregular rollers 31 are provided respectively on two ends of the roller axle 32; when there are more than two irregular rollers 31 on one roller axle 32, the irregular rollers 31 are evenly provided on the roller axle 32.

Figure 5:
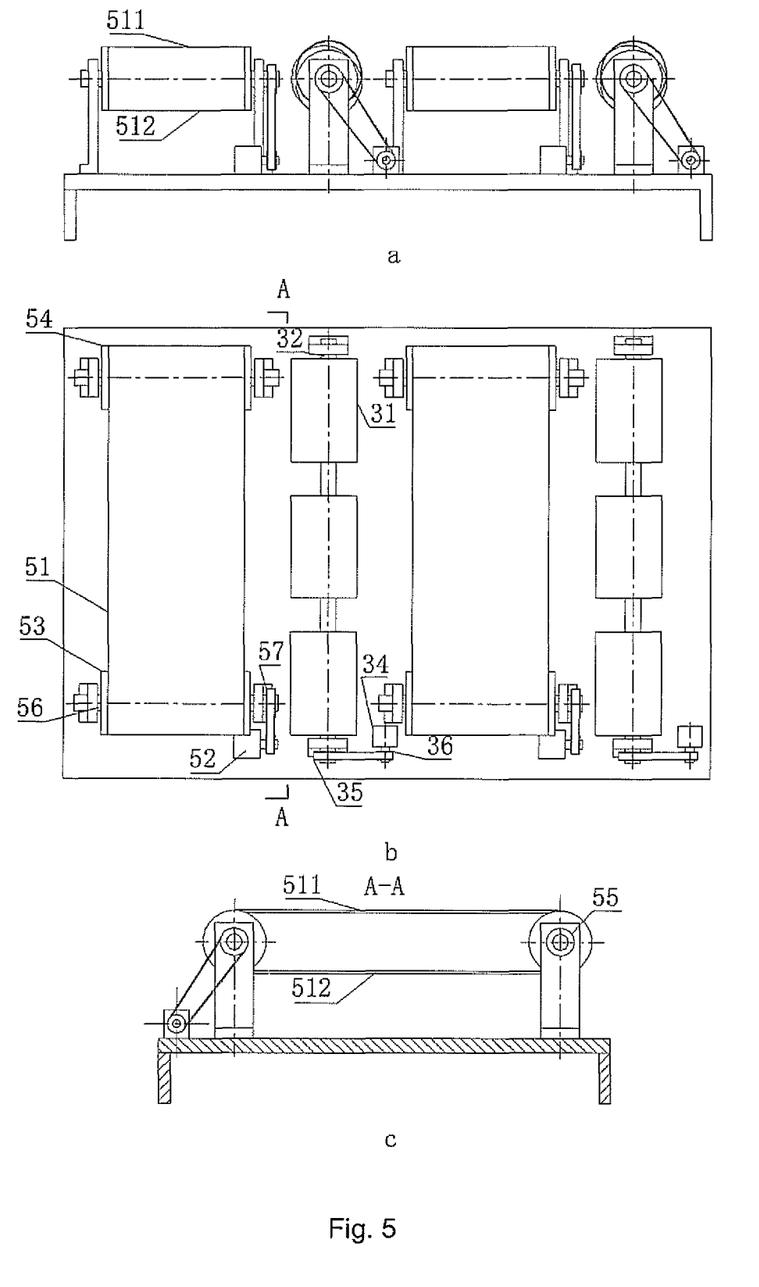

The conveyor belt 5 includes a transport belt 51, a driving unit 52, a first guide wheel 53 and a second guide wheel 54. The transport belt 51 can be a synchronous belt, a flat belt or a V-shaped belt. The transport belt 51 successively passes the first guide wheel 53 and the second guide wheel 54, and a closed loop including a loaded layer 511 (usually the upper layer) for transporting objects and an unloaded layer 512 (usually the lower layer) for not transporting objects is formed, as shown in FIG. 5. The continuous movement of the transport belt transports the objects. The first guide wheel 53 and the second guide wheel 54 can be installed on a guide wheel shaft 56. The guide wheel shaft 56 can be installed on a guide wheel shaft support system of the frame 100 via a bearing 55. A pulley or a chain wheel 57 can also be provided on the guide wheel shaft. The driving unit 52 drives the first guide wheel 53 and the second guide wheel 54 by driving the pulley or chain wheel 57, and then drives the transport belt 51 to rotate. The driving unit 52 is provided on a driving unit support system of the frame 100, or the first guide wheel 53 and the second guide wheel 54 are provided on the guide wheel shaft 56 via the bearing 55, and the guide wheel shaft 56 is provided on the guide wheel shaft support system of the frame 100. The conveyor belt 5 can further include a bearing member, a tensioning mechanism, among others. The bearing member can be a flat plate or a roller, which is located between the upper and lower layers of the transport belt and is close to the upper layer in order to bear the weight of the transported objects. The tensioning mechanism can keep the transport belt at a certain level of tension and sag to ensure normal operation of the conveyor belt 5. The conveying directions of the conveyor belts 5 located in the same transportation channel are parallel to each other, and the upper surfaces of the conveying belts 5 (the upper surface of the loaded layer 511 of the transport belt) are in the same plane.

The driving unit 52 of the conveyor belt 5 can be commonly used ones, such as a motor drive, a pneumatic drive, or a hydraulic drive, among others. The transmission modes for driving two groups of transportation rollers can also be different, which can be gear transmission, belt transmission, chain transmission or worm gear transmission, or other commonly used transmission modes. Different components, such as motors, pulleys, gears, worm gears and worms may be provided for different transmission modes. When a belt transmission is used, a tensioning mechanism may be provided on the conveyor belt to relieve slipping of the conveyor belt during transmission. The driving unit 52 may include a motor and a pulley. The conveyor belt 5 of the conveying device may also be a chain plate.

The conveyor belt 5 may include a driving unit 52, as shown in FIG. 5 (the conveyor belt 5 itself includes a driving unit), or the driving unit 34 of the conveying device may be used to drive the conveyor belt.

Figure 1:
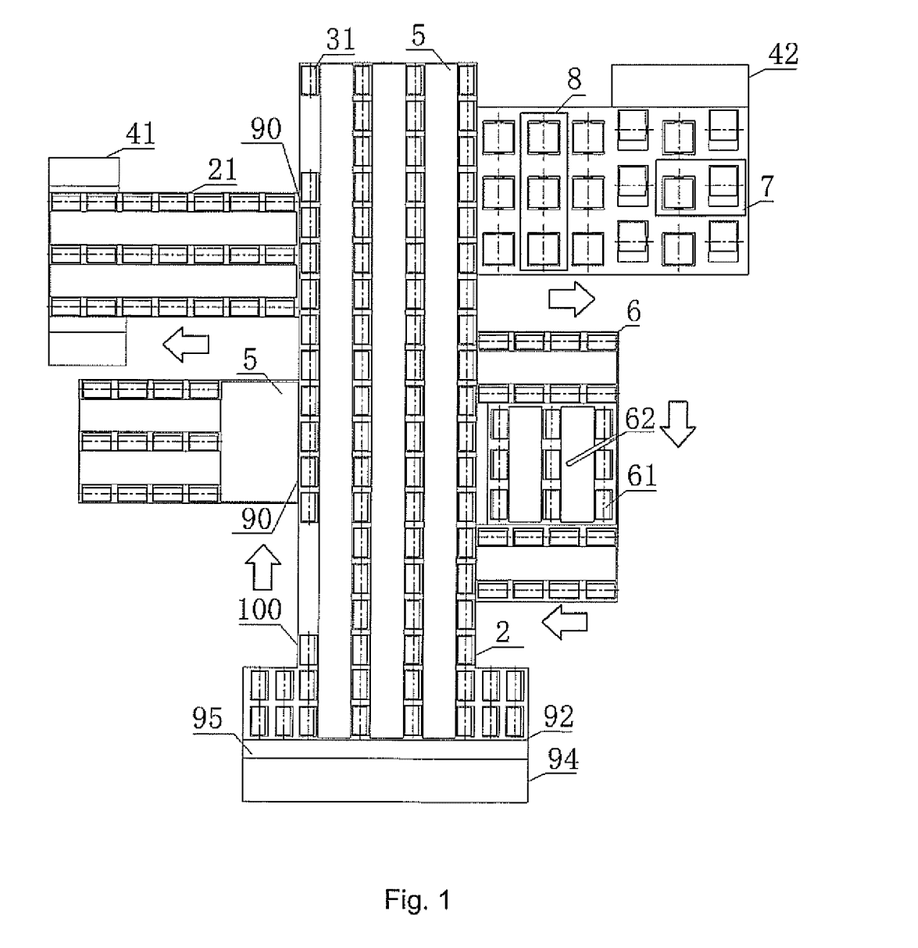
FIG. 1 is a schematic structural diagram of an embodiment of the present invention.
Figure 2:
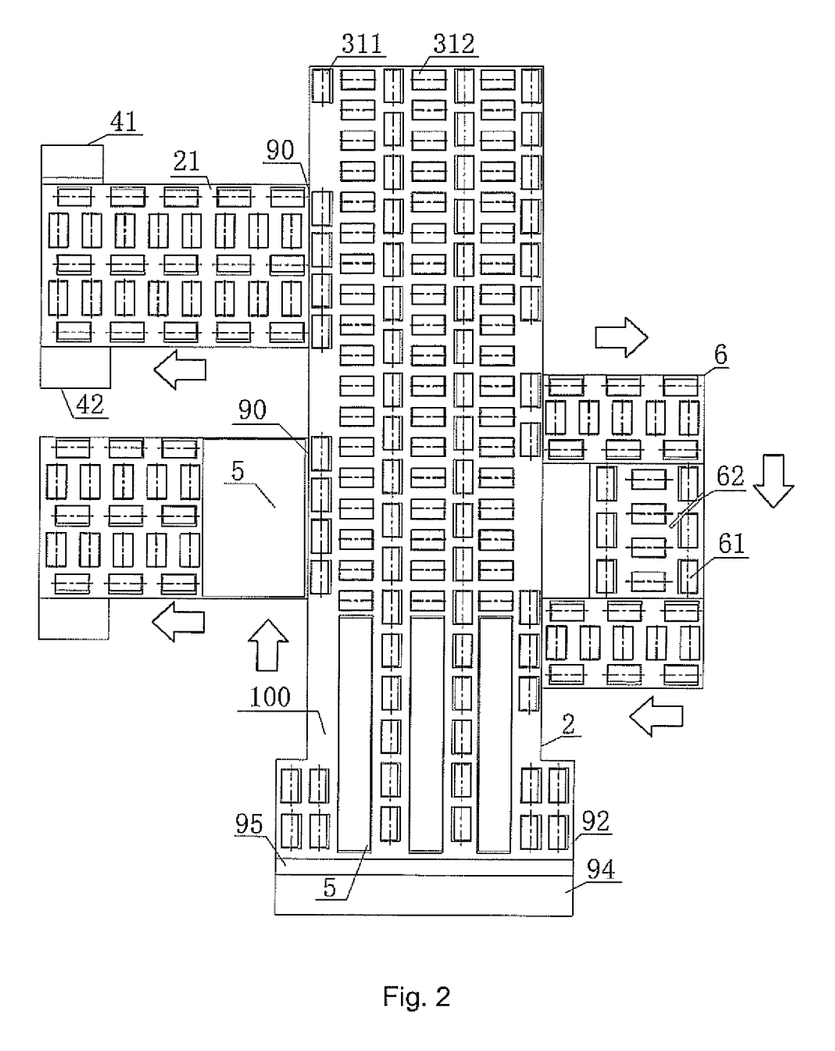
FIG. 2 is a schematic structural diagram of an embodiment of the present invention.
Figure 7:
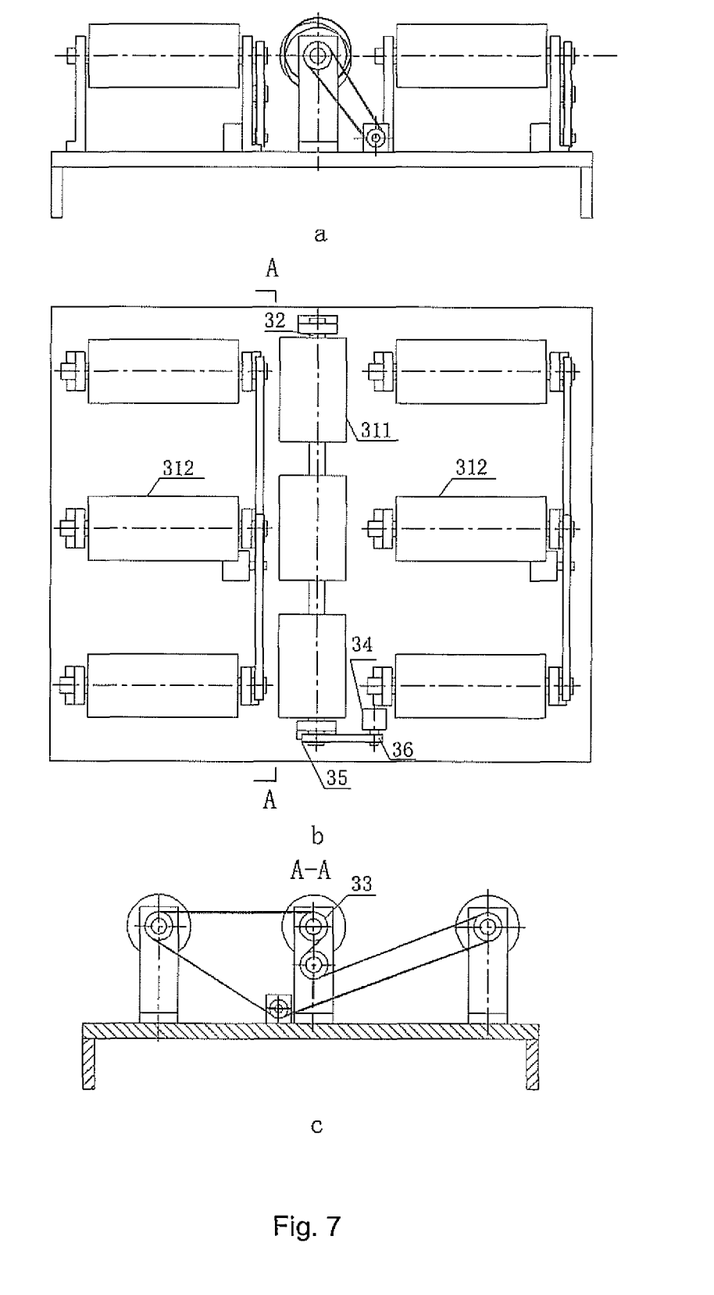

The conveying direction of the transportation channel is indicated by the arrow, as shown in FIGS. 1, 2 and 7. The irregular rollers 31 are provided on the branch conveying mechanism. The conveyor belt 5 or the regular rollers 312 are provided above the transportation channel. The rotation center lines of the irregular rollers 31 are not perpendicular to the rotation center lines of the regular rollers or the conveyor belt guide wheels. The branch conveying mechanisms can be provided alternately with the transportation channels. As shown in FIG. 1, there is a row of irregular rollers 31 between two adjacent conveyor belts 5 or two adjacent rows of regular rollers 312, and a conveyor belt 5 or a row of regular rollers 312 are provided between two adjacent rows of irregular rollers 31. The rotation center line of the irregular rollers 31 are parallel to the conveyor belt 5, and the distances between the rotation center line of the irregular rollers and the adjacent conveyor belts 5 are equal. The distances between two adjacent conveyor belts are equal; the distances between two adjacent rows of the regular roller 312 are equal; the distances between two adjacent rows of irregular rollers 31 are equal, and the distances between two adjacent irregular rollers 31 in the same row are equal. The two sides of the transportation channel at the sorting outlet or inlet 90 are provided with irregular rollers 31. The number of rows of the conveyor belts 5 and the regular rollers 312 and the number of rows of the irregular rollers 31, the length of the conveyor belt 5 and the number of the regular rollers 312 and the number of the irregular rollers 31 are determined according to the transportation requirements. The conveying direction of the irregular rollers 31 is perpendicular to the conveying direction of the conveyor belt 5 and the regular rollers 312; the conveying direction of the conveyer belt 5 and the regular rollers 312 is parallel to the conveying direction of the transportation channel; and the conveying direction of the irregular rollers 31 is perpendicular to the conveying direction of the transportation channel. Alternatively, two rows of branch conveying mechanisms are arranged alternately with one transportation channel, and there is at least one row of irregular rollers 31 between two adjacent conveyor belts 5 or two adjacent rows of regular rollers 312 (as shown in FIGS. 7a, 7b). The rotation center lines of the two rows of irregular rollers 31 are parallel to the conveyor belt 5 and are located in the same plane. The distances between the two rows of irregular rollers 31 and the adjacent conveyor belt 5 or the regular rollers 312 are equal. During transportation of objects, the two rows of irregular rollers 31 between two adjacent conveyor belts 5 or between two adjacent rows of regular rollers 312 can be rotated in opposite directions, so that the objects can move in different directions.

The rotation center line of the irregular rollers 31 is lower than the upper surface of the conveyor belt 5 (the upper surface of the loaded layer of the transport belt 51) or the highest point of the regular rollers 312. The vertical distance from the rotation center line of the irregular roller 31 to the upper surface of the conveyor belt is the height difference between the irregular roller and the conveyor belt. The vertical distance from the rotation center line of the irregular roller 31 to the highest point of the regular roller is the height difference between the irregular roller and the regular roller. The short radius of the irregular roller 31 (the shortest vertical distance from the section profile that is perpendicular to the rotation center line of the irregular roller to the rotation center line, for example, the section of an elliptical cylindrical roller perpendicular to the rotation center line thereof is an ellipse, the rotation center line of the elliptical cylindrical roller passes through the center of the ellipse, and the minor axis of the ellipse is the short radius of the elliptical cylindrical roller; the section of a regular polygonal prism roller perpendicular to the rotation center line is a regular polygon, the rotation center line of the regular polygonal prism roller passes through the center of the regular polygon, and the distance from the center to the midpoint of a regular polygon side is the short radius of the regular polygon prism roller; the section of a cylindrical eccentric roller perpendicular to the rotation center line thereof is an eccentric circle, the rotation center line of the cylindrical eccentric roller passes through the center of the eccentric circle, and the shortest distance from the eccentric circle profile to the center is the short radius of the eccentric roller) is smaller than the height difference between the irregular roller 31 and the conveyor belt 5 or the regular roller, and the long radius of the irregular roller 31 (the longest vertical distance from the section profile that is perpendicular to the rotation center line of the irregular roller to the rotation center line, for example, the section of a elliptical cylindrical roller perpendicular to the rotation center line thereof is an ellipse, the rotation center line of the elliptical cylindrical roller passes through the center of the ellipse, and the major axis of the ellipse is the long radius of the elliptical cylindrical roller; the section of a regular polygonal prism roller perpendicular to the rotation center line is a regular polygon, the rotation center line of the regular polygonal prism roller passes through the center of the regular polygon, and the distance from the center to the point of intersection of two sides of the regular polygon is the long radius of the regular polygon prism roller; the section of a cylindrical eccentric roller perpendicular to the rotation center line thereof is an eccentric circle, the rotation center line of the cylindrical eccentric roller passes through the center of the eccentric circle, and the longest distance from the eccentric circle profile to the center is the long radius of the eccentric roller) is greater than the height difference between the irregular roller 31 and the conveyor belt or the highest point of the regular roller 312, as shown in FIG. 5(a). When the conveyor belt 5, the regular roller 312 and the irregular roller 31 rotate simultaneously, since the long radius of the irregular roller is greater than the distance between the rotation center line of the irregular roller and the upper surface of the conveyor belt or the highest point of the regular roller, when the irregular roller rotates to a certain position, the object can be lifted by it and the irregular roller is higher than the conveyor belt 5 or the regular roller to prevent the conveyor belt 5 or the regular roller from becoming an obstacle to the movement of the object. The height of the long radius of the irregular roller above the upper surface of the conveyor belt 5 or the regular roller should be proper, i.e., not too big and not too small. When the height is big, the conveyor belt 5 or the regular roller will generally no longer be an obstacle to the movement of the object, and the object moves a big distance when the irregular roller rotates for one round. When the height is small, an uneven object or other items on the object may come into contact with the conveyor belt 5 or the regular roller and thus hinder the movement of the object, and the object moves a small distance when the irregular roller rotates for one round. Since the short radius of the irregular roller is lower than the upper surface of the conveyor 5 or the highest point of the regular roller, when the irregular roller rotates to a certain position, the highest point of the irregular roller is lower than the highest point of the conveyor belt 5 or the highest point of the regular roller, and the irregular roller will no longer become an obstacle to the movement of the object, so that the conveyor belt or the regular roller can transport the object alone. During rotation of the roller, the highest point of the top is when the long radius is upward, and the lowest place of the top horizontal plane is when the short radius is upward.

One or more rows of irregular rollers 31 located on the same branch conveying mechanism may be driven by one driving unit or by different driving units. When driven by one driving unit, the state of installation of the irregular rollers 31 for one transportation channel on the roller axle should be the same (the directions and positions of the short radius and long radius of the irregular rollers should be the same relative to the rotation center line of the irregular rollers) to ensure that the irregular rollers for one transport channel are in the same contact state with the object when the object is driven, so as to prevent the object becoming unstable or the irregular rollers becoming an obstacle to the movement of the object due to the highest points of some irregular rollers 31 are higher than the highest points of other irregular rollers. Generally, when the irregular roller 31 does not rotate, the short radius of the irregular roller is upward (if the long radius is upward, it will become an obstacle to the transportation of the conveyor belt 5). When the irregular rollers are not driven by one driving unit, the state of installation and moving speed of the irregular rollers 31 for one transportation channel on the roller axle should be as the same as possible to prevent some of the rollers from being too high during rotation to make the object unstable or become an obstacle to the movement of the object.

In the conveying device, parameters such as the length and width of the transport belt 51 of the conveyor belt 5, the width and number of the irregular rollers 31, the spacing between irregular rollers 31, the width and number of the regular rollers, the spacing between regular rollers, and the distance between the irregular rollers 31 and the conveyor belt 5 or the regular rollers can be determined according to the object to be conveyed. When the object to be conveyed is relatively big but light, the driving force required for movement of the object is relatively small. In order to reduce the weight of the conveying device, the sizes of the conveyor belt or the regular roller and the irregular roller and the positional relationship therebetween can be adjusted accordingly. The sizes of the conveyor belt or the regular roller and the irregular roller can be reduced, and the spacing between the conveyor belt or the regular roller and the irregular roller can be increased. The number of irregular rollers 31 can be reduced, or the irregular roller 31 can be simplified, such as part of the irregular roller 31 can be removed. However, simplification of the irregular roller is not limited thereto, as long as the purpose of simplification can be achieved without affecting the normal operation of the roller.

When the object to be transported is light, in order to ensure normal transportation of the object, the minimum side length of the irregular roller 31 (the minimum one of the length, width and height of the object) is greater than the distance between the conveyor belt 5 or the rotation center line of the regular rollers and the rotation center lines of adjacent two rows of irregular rollers 31 on either side of the conveyor belt 5 or the regular rollers (the rotation center lines of the irregular rollers 31 in the same row are on the same straight line), and is greater than the spacing between the irregular rollers 31 in the same row, so as to ensure that in the transport process the object can always be in contact with an irregular roller 31 and a conveyor belt 5 or a regular roller, so that the irregular roller 31 and the conveyor belt 5 or the regular roller can continuously drive the object to move. When the object is in contact with an irregular roller 31 and a conveyor belt 5 or a regular roller, one portion of the object is located on the conveyor belt 5 or the regular roller, and the other portion of the object is located on the irregular roller 31. When the irregular roller 31 rotates, the highest point of the long radius of the irregular roller 31 is higher than the highest point of the conveyor belt 5 or the regular roller. This will cause the side of the irregular roller to be higher than the conveyor belt 5 or the regular, which makes the object unstable. During transportation, one side of the object will go up and down. This unstable transportation will damage the object. When the object to be conveyed is relatively heavy, in order to ensure normal transportation of the object, the minimum side length of the object is greater than the distance between the rotation center lines of adjacent three rows of irregular rollers 31, and is greater than the spacing between the irregular rollers 31 in the same row, so as to ensure that in transportation the object can always be in contact with two rows of irregular rollers 31 and a conveyor belt 5 or a regular roller, so that the object can run stably.

The frame 100 may further include an upper plate 104, or a lower plate, or both. When the upper and lower plates exist, the frame 100 further includes supporting systems for the upper and lower plates.

When the upper plate 104 or the lower plate exists, the irregular rollers 31 and the driving unit 34 can be provided on the upper plate 104 or the lower plate. During the rotation of the irregular roller 31, part of the irregular roller 31 or the upper portion (the upper portion of the roller or the portion of the roller above the roller axle). may extend above the upper surface of the upper plate. The roller axle is generally provided under the upper plate and abuts against the bottom surface of the upper plate (to prevent debris of the object on the conveyor belt from getting stuck in the gap between the roller axle and the surface). The upper plate can also be used to support the weight of the object conveyed and protect the irregular rollers and their roller axles. The driving unit 52 of the conveyor belt 5 or the regular roller may be provided on the lower plate.

When the object is conveyed, the object is on the irregular roller 31, and the object is in contact with the irregular roller 31. The surface of the object in contact with the irregular roller 31 is the transportation surface of the irregular roller 31 (the transportation surface is generally a plane parallel to the horizontal plane, but can also be a high-to-low oblique plane), the surface of the conveyor belt 5 in contact with the object is the transportation surface of the conveyor belt (the transportation surface is generally flat); the surface of the object in contact with the regular roller is the regular roller transportation surface (the transportation surface is generally flat). The irregular roller has multiple transportation surfaces, and the transportation surfaces of the irregular roller 31 move up and down with rotation of the irregular roller 31. There is only one transportation surface for the conveyor belt. When the transportation surface of the irregular rollers is a flat surface (the contact state between the object and the irregular roller is tangent, and the rotation axis of the irregular rollers are in the same plane), the maximum vertical distance between the transportation surfaces of the irregular roller and the rotation center line of the irregular roller is equal to the long radius of the irregular roller, and the minimum vertical distance therebetween is equal to the radius of the regular roller, and the portion of the irregular roller which is lower than the regular roller is not in contact with the object. When the transportation surface of the conveyor belt is a flat surface, the upper surface of the conveyor belt 5 is in contact with the object, and the plane in which the upper surface of the conveyor belt 5 is present is the transportation surface of the conveyor belt.

At least one detecting unit is provided on the conveying device for detecting the stop state of the irregular roller 31. When the irregular roller 31 stops, the short radius must be upward (if the long radius is upward, it will become an obstacle to the transportation of the conveyor belt 5). The transmission shaft of the irregular roller 31 or the shaft of an electric motor (or a hydraulic or pneumatic motor) or the rotation axle of the irregular roller 31 may be provided with a transparent optical code disc (a grating encoder or a photoelectric encoder), or a reflective code disc (or a non-reflective color block) is provided on a side surface of the irregular roller 31, or Hall components or another position sensor can be used to detect the stop position of the irregular roller 31; or a Geneva mechanism can also be used to drive the irregular roller 31 so that the irregular roller 31 can be stopped at a fixed position. Alternatively, one state of the irregular roller 31 can be set as the initial state thereof, and when the stop state of the irregular roller 31 is detected to be inconsistent with the initial state, the driving unit will be started immediately to move the irregular roller 31 to the initial state, or one state of the irregular roller 31 is temporarily set as a target state, and when the irregular roller 31 is inconsistent with the target state, the driving motor will bring the irregular roller 31 to move to the target state to ensure that the irregular rollers 31 are in the same state. If the deceleration of the driving unit is small, a weight can be provided at the extension line of the short radius of the irregular roller passing through the center of the rotation axis, and the inertia of the roller can be applied to adjust the roller to the state that the short radius is upward.

The transportation channel may further include an outlet or inlet 92, which can be connected with other handling devices, or not connected with any device and only serves as an outlet or inlet of objects. The outlet or inlet 92 can be connected with other devices for further handling (sorting, packaging or palletizing). The outlet or inlet 92 of the transportation channel can be widened (i.e., the transportation channel near the outlet or inlet is in the shape of "T" or inverted "T"), so that multiple objects can be placed side by side and enter and exit together to facilitate entry and exit of objects and increase the efficiency of sorting and transportation. The widened portion of the transportation channel at the outlet or inlet 92 may be provided with one or more rows of irregular rollers, or one or more conveyor belts, or one or more rows of regular rollers, as shown in FIG. 1. Generally, the rotation center lines of the irregular rollers at the widened portion of the transportation channel at the outlet or inlet 92 are on the same straight line or in the same plane, the rotation center lines of the regular rollers at the widened portion of the transportation channel at the outlet or inlet 92 are on the same straight line or in the same plane, the conveyor belts 5 at the widened portion of the transportation channel at the outlet or inlet 92 are parallel to each other, and the upper surfaces of the conveyor belts 5 are on the same plane. The rotation center lines of the irregular rollers at the widened portion of the transportation channel at the outlet or inlet 92 may be parallel to the rotation center lines of other irregular rollers 31 of the transportation channel, or form an angle therewith.

When irregular rollers 31 are provided at the widened portion of the transportation channel inlet 92, as shown in FIG. 1, an object can be transported to the widened portion of the transportation channel by other devices. The irregular rollers 31 at the widened portion of the transportation channel acts on the object to move the object to the non-widened portion of the transportation channel inlet 92, and the object will be moved along the transportation channel under the action of the irregular rollers 31 and the conveyor belt 5 or regular rollers at the non-widened portion of the transportation channel inlet 92.

When irregular rollers 31 are provided at the widened portion of the transportation channel outlet, the object is moved to the widened portion of the transportation channel under the action of the irregular rollers 31 and the conveyor belt 5 or regular rollers at the non-widened portion of the transportation channel outlet. The irregular rollers 31 or the conveyor belt 5 or the regular rollers drive the object to move to a packing or palletizing platform (or another device or structure) through the transportation channel outlet.

The transportation channel includes a primary transportation channel 2 and a secondary transportation channel. The primary transportation channel 2 and the secondary transportation channel are connected by a sorting outlet or inlet 90. Generally, the transportation channel is a flat and straight channel for transportation of objects that need to be sorted or conveyed. The transportation channel can also be an annular channel, an angled flat and straight channel (the angle is greater than 0 and less than 180 degrees) or an inclined channel. The shape and size of the transportation channel should not be limited to the cases set forth above, as long as sorting and transportation can be achieved.

The secondary transportation channel may include a first-level secondary transportation channel 21, a second-level secondary transportation channel 22, and an $N^{th}$-level secondary transportation channel 2N, where N is greater than 2. The secondary transportation channel is connected to the primary transportation channel 2 through a sorting outlet or inlet 90. The thus connected primary transportation channel 2 and the secondary transportation channel are not parallel to each other, but vertical to each other or forming an angle than a straight angle. The primary transportation channel 2 is connected with the first-level secondary transportation channel 21 to form an object transportation channel, and the objects from the primary transportation channel inlet enter and move along the primary transportation channel 2. The objects that have been sorted out enter the first-level secondary transportation channel 21 through the sorting outlet or inlet 90, and the remaining objects continue to move along the primary transportation channel to the next sorting outlet or inlet 90 or primary sorting channel outlet, and the objects that have been sorted out can enter the second-level transportation channel 22 through the sorting outlet or inlet 90, or are moved to the outlet of the secondary transportation channel 21.

The conveying device can also be provided with multiple primary transportation channels 2, that is, multiple inlets of objects are present. Objects can enter the conveying device through multiple inlets, and multiple primary transportation channels 2 can be used to gather the objects into the first-level secondary transportation channel 21, or not gather the objects into the same first-level secondary transportation channel 21. The primary transportation channels 2 each have its own secondary transportation channel, and the secondary transportation channels of the primary transportation channels 2 can be communicated with one another, and the communicated transportation channels can finally go to one sorting outlet or inlet 90.

At the sorting outlet or inlet 90 of the conveying device, the highest point of rotation of the irregular roller 31 of the first-level secondary transportation channel 21 is slightly lower than the highest point of rotation of the irregular roller 31 of the primary transportation channel 2, the upper surface of the conveyor belt 5 on the first-level secondary transportation channel 21 is slightly lower than the upper surface of the conveyor belt 5 on the primary transportation channel 2, so that the objects on the primary transportation channel 2 can be moved to the secondary transportation channel. During the movement, the height of the irregular roller 31 and the conveyor belt or the regular roller of the secondary transportation channel 2 will not hinder the transportation of objects. In the conveying device, the highest point of the irregular roller 31 and the upper surface of the conveyor belt or the highest point of the regular roller on a lower-level transportation channel are respectively slightly lower than the highest point of the irregular roller 31 and the upper surface of the conveyor belt or the highest point of the regular roller of the higher-level transportation channel. A lower-level transportation channel is a relative matter with respect to a higher-level transportation channel. The level of the primary transportation channel 2 is higher than the level of the first-level transportation channel 21, and the level of the first-level secondary transportation channel 21 is higher than the second-level secondary transportation channel 22, and so on.

In order to meet certain special needs, in the conveying device, the rotation center lines of part of the irregular rollers 31 in the same row are on one straight line, and the rotation center lines of other irregular rollers 31 in the same row are parallel to the rotation center lines of said part of irregular rollers.

The conveying device may also include a sorting module 7, as shown in FIG. 1. The sorting module 7 is located at the upper part of the transportation channel. The sorting module 7 includes two groups of transportation rollers, roller axles, and bearings. The two groups of transportation rollers are column rollers. At least one of the two groups of transportation rollers are irregular rollers 712, and the other group of transportation rollers are regular rollers 711 (the section of the roller perpendicular to the rotation center line is a circle, and the rotation center line passes through the center of the section, such as a cylindrical roller) or irregular rollers 712, each group of transportation rollers include at least one row of transportation rollers, each row of transportation rollers include at least one transportation roller; the rotation center lines of each row of transportation rollers are on one straight line, and the rotation center lines of the two groups of transportation rollers are not parallel to each other, such as perpendicular to each other or form an angle that is not a right angle.

The two groups of transportation rollers of the sorting module 7 can include a group of regular rollers and a group of irregular rollers, or the two groups are irregular rollers. Each group of transportation rollers includes at least one row of transportation rollers. It would be possible that the group of regular rollers and the group of irregular rollers each include at least one row of transportation rollers, for example, one row of regular rollers and one row of irregular rollers, two rows of regular rollers and one row of irregular rollers, one row of regular rollers and two rows of irregular rollers, N rows of regular rollers and N rows of irregular rollers (where N is greater than or equal to 2); or two groups of irregular rollers each include at least one row of transportation rollers, for example, two rows of irregular rollers, three rows of irregular rollers, and M rows of irregular rollers (where M is greater than 3). Each row of transportation rollers include at least one transportation roller (located at the center of the roller axle), two transportation rollers (located respectively on each end of the roller axle) or three transportation rollers or more (provided evenly on the roller axle). When each group of transportation rollers include at least two rows of transportation rollers, the rotation center lines of two rows of transportation rollers are parallel to each other.

The two groups of transportation rollers of the sorting module 7 are located at the upper end of the sorting module 7. The rotation center lines of the two groups of transportation rollers may not be in the same plane. The rotation center lines of the two groups of transportation rollers can be in the same plane, or the rotation center lines of the two groups of transportation rollers are located in two different planes, but the rotation center lines of the same group of transportation rollers are located in the same plane.

Figure 8:
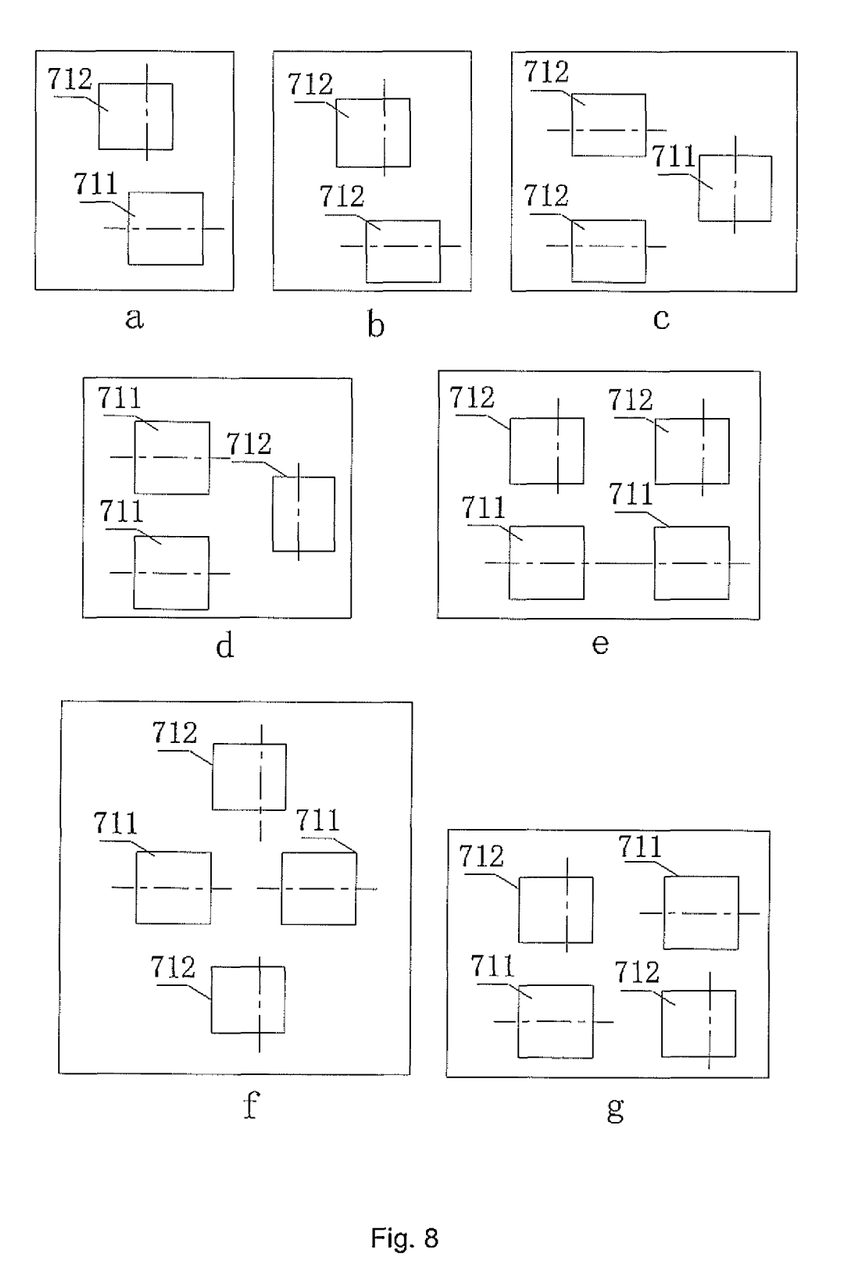

The number of rows of rollers included in the two groups of transportation rollers of the sorting module 7 can vary, and the relative positions of the rotation center lines of the two groups of transportation rollers can also vary. Then the two groups of transportation rollers in the sorting module 7 can be provided in many ways. The smallest sorting module 7 is that each group of transportation rollers include one row of transportation rollers, and each row of transportation rollers include one transportation roller. When the two groups of transportation rollers are projected to the same plane, the arrangement of the two groups of transportation rollers can be in the shape of "L", "T" or a shape obtained by rotating either of the above two shapes, as shown in FIGS. 8(*a*) and 8(*b*). When one group of transportation rollers include two rows of transportation rollers, the other group of transportation rollers include one row of transportation rollers, and each row of transportation rollers include one transportation roller, and when the two groups of transportation rollers are projected to the same plane, the arrangement of the two groups of transportation rollers can be in the shape of "n" or the shape obtained by rotating "n", or the shape of "double T", as shown in FIGS. 8(*c*), 8(*d*) and 6(*e*). When each group of transportation rollers include two rows of transportation rollers, each row of transportation rollers include one transportation roller, and when the two groups of transportation rollers are projected to the same plane, the arrangement of the two groups of transportation rollers can be in the shape of a "cross" or "double T", as shown in FIGS. 8(*f*) and 8(*g*).

The sorting module can also be regarded as a conveying device that joins a transportation channel and a branch conveying mechanism.

The transportation channel can also be provided with some supporting universal balls to increase stability of the objects during transportation. A universal ball may be provided between two rollers, and the vertical distances from the universal ball to the rotation center lines of the two rollers are equal. Alternatively, a universal ball may be provided between four transportation rollers, and the distances from the universal ball to the centers of the four adjacent transportation rollers are equal, and the highest point of the universal roller is generally flush with the highest point of the regular roller.

Figure 9:
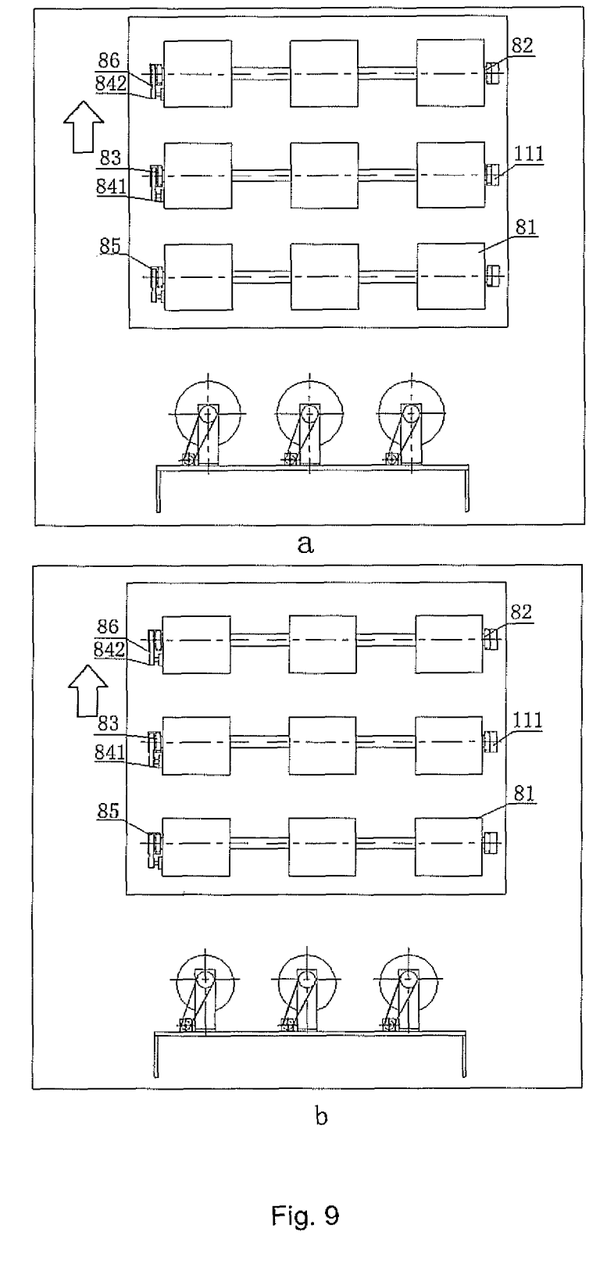

The conveying direction of the transportation channel is shown in FIG. 9. The arrow points to the positive direction of conveying, and the arrow tail points to the negative direction. The rotation center line of the transportation rollers 81 is perpendicular to the conveying direction. The transportation rollers 81 drive the object to move along the conveying direction of the transportation channel.

When an upper plate 104 or a lower plate of the conveying device exists, the rollers of the transportation channel and the driving unit thereof can be provided on the upper plate 104 or the lower plate. During rotation of the rollers, part of the transportation roller or an upper portion thereof (an upper portion of the transportation roller or the part above the roller axle) can extend above the upper surface of the upper plate. The roller axle is generally provided under the upper plate 104 and against the lower surface of the upper plate (to prevent debris of the object on the conveyor belt from being caught in the gap between the roller axle and the surface). The upper plate can be used to support the weight of the object being transported and protect the transportation roller 81 and the roller axle 82 thereof.

In sorting, from the primary transportation channel 2, the objects enter the first-level secondary transportation channel 21 through the sorting outlet or inlet 90. In order to ensure smoothness of the sorting, the highest point of the primary driving wheel of sorting module 7 of the primary transportation channel at the sorting outlet or inlet 90 is higher than the highest point of the roller or the primary driving wheel of the sorting module of the first-level secondary transportation channel. In order to ensure safety of the objects in operation, the height difference therebetween should not be too big. The connection state of the first-level secondary transportation channel 21 and the second-level secondary transportation channel 22 is also like this, that is, the highest point of the roller of the transportation channel or the primary driving wheel of the sorting module of a lower level transportation channel should be lower than, or flush with the highest point of the primary driving wheel of the sorting module of the higher level transportation channel.

The conveyor belt 5 can also be separately provided for a transportation channel. As shown in FIG. 1, the width of the conveyor belt 5 is slightly smaller than that of the transportation channel. Irregular rollers 31 can also be provided for the transportation channel where the conveyor belts 5 is provided, and the irregular rollers 31 are provided alternately with the conveyor belt. The transportation channel where the conveyor belt 5 is provided can also be provided with a sorting module 7 and another transportation channel. The conveyor belt 5 and the sorting module 7, the another transportation channel can be provided in sequence or alternately provided side by side. Conveyor belt is simple in structure and can be in complete contact with the bottom surface of an object so that the object can be transported in a stable way. A conveyor belt is more suitable to be provided for a long transportation channel where a sorting module 7 is not required.

There may also be an recognition system 6 for sorting on the conveying device. As shown in FIG. 1, the recognition system 6 may be a QR code recognition system or a barcode recognition system. Information about an object, such as product type, weight, address, among others, can be stored in a barcode or a OR code, which can be affixed to any position of the object. The recognition system can be a scanning gun. The recognition system 6 can be equipped with a scanning device. The scanning gun can be fixed on the frame, or it can be fixed above the object through a support, or fixed at one side of the object, or at the bottom of the rack where the QR code or barcode on the bottom of the object is recognized through the gap between the rollers of the transportation channel or sorting system. When the QR code is located at the front or rear side of the object, the scanning gun cannot be provided in front or rear of the object, because this arrangement will become an obstacle to the transportation of the object. Therefore, when the QR code is located at the front or rear side of the object, the scanning device would not be able to scan the object. A flip system may be provided behind the recognition system. The flip system may include a flip channel 61 and a flip plate 62. One end of the flip channel is provided behind the recognition system 6, and the other end is provided in front of the recognition system. The objects that cannot be recognized by the recognition system 6 can be moved to the flip channel through the sorting module, and then moved to the flip plate. The flip plate is perpendicular to the transportation surface and forms an angle with one side of the flip channel. When the object is moved to the flip plate, it cannot pass through. The object will collide with the flip plate, and the flip plate will drive the object to rotate for a certain angle. The object passes through the sorting module of the flip channel and is moved to the transportation channel. The recognition device 6 will re-sort the object. Due to the flip for a certain angle, the original front or rear end of the object become a side of the object, and the scanning device at that side will be able to scan the QR code. The recognition system may include a scanning module, a control module, a communication module, and a server. The QR code recognition system may include a scanning gun, which can scan the QR code of an object and generate identity data, and the identity data generated by the identification module are processed by the control module and sent to the communication module. The communication module transmits the identity data to the server. The server compares the identity data with the data in the user identity database and obtains identification data. The server transmits the identification data to the communication module, and the identification data received by the communication module is processed by the control module and action data will be sent to the motor of the driving unit, so that the motor drives the sorting module 7 or the transportation channel to move and complete the sorting process. The recognition system and recognition process are not limited to the above, as long as the product can be identified. The recognition system 6 can also use radio frequency identification technology (RFID). The recognition system 6 can include an electronic tag card, an electronic tag writer, an electronic tag reader and a central system. Each object can be provided with an electronic tag card, and the information of the object can be written into the electronic tag card by the electronic tag writer. The electronic tag reader is provided on the transportation channel to read the information of the electronic tag and upload it to the central system. The information can be processed by the central system, and the drive control module will respond to handle the object. The electronic tag card can be put in a special card bag, which can be attached to the object. The electronic tag card can be reused.

The outlet or inlet 92 of the transportation channel of the conveying device can also be provided with a workbench 94 respectively, as shown in FIG. 1. The objects to be sorted can be placed on the workbench 94 at the inlet, and then pushed manually or by another mechanism to the transportation channel. A row of objects that have been sorted out will be transported to the workbench at the outlet through the transportation channel or another mechanism, and then packed or palletized.

The conveying device may also include a slide-way 95, as shown in FIG. 1. The slide-way is located at the sorting outlet or inlet 90 or the inlet or outlet 92 of the transportation channel, and the slide-way is connected with the transportation channel and the workbench 94 at the outlet or inlet 92 of the transportation channel, respectively. The objects can slide from the workbench 94 at the inlet to the conveying device through the slide-way. When the object slides down from a higher place, an initial speed can be imparted to the object to move the object on the transportation channel. When multiple objects slide down in order, a forward driving force can be given by the object that slides down later to the object that slides down earlier, thereby driving the object to move on the transportation channel, so as to prevent congestion of the objects from happening during the conveying process. The objects can also slide from the transportation channel to the workbench at the outlet for stacking or packaging. Object sliding down from a higher place can impart the object an accelerated speed, driving the object to accelerate and move to the workbench, effectively shortening the moving time and improving efficiency. When multiple objects slide down in order, a forward driving force can be given by the object that slides down later to the object that slides down earlier, thereby driving the object to accelerate and move to the workbench.

What is claimed is:

1. A conveying device comprising:
a frame,
at least one transportation channel, and
at least one branch conveying mechanism,
the at least one transportation channel and the at least one branch conveying mechanism are driven by their respective driving units, and the at least one transportation channel is provided with a number of rows of regular rollers, or at least a conveyor belt, or a combination of regular rollers and a conveyor belt,
wherein the at least one branch conveying mechanism includes at least one group of irregular rollers, each group of the irregular rollers includes at least one row of the irregular rollers, and roller axles of the irregular rollers are provided on the frame via a roller axle support system, the cross-section of the irregular roller perpendicular to a rotation center line of the irregular roller is non-circular or eccentric, and the non-circular cross-section is substantially an ellipse, a regular polygon or another shape; a rotation center line of the eccentric cross-section does not pass through its center; when the irregular roller rotates, the highest point of a top of the roller is higher than an upper surface of an adjacent transportation channel during the rotation, and the lowest point of a top of the roller is lower than the upper surface of the adjacent transportation channel; when the irregular roller does not rotate, the top of the roller substantially stops at the lowest point of the top of the roller during rotation; and
wherein the at least one transportation channel and the at least one branch conveying mechanism are provided alternately, and the at least one transportation channel is not parallel to rotation center lines of the rollers of the at least one branch conveying mechanism.

2. The conveying device according to claim 1, wherein in each one of the at least one transportation channel, the regular rollers provide a transportation direction which is substantially the same with that provided by the conveyor belt, the irregular rollers of the at least one branch conveying mechanism provides a transportation direction which is perpendicular to the transportation direction of the conveyor belt or the regular rollers of an adjacent transportation channel, the irregular rollers have rotation center lines that are perpendicular to rotation center lines of the regular rollers.

3. The conveying device according to claim 1, wherein the conveying device further includes driving units, the irregular rollers, the regular rollers or the conveyor belt can be driven by their respective driving units, and one driving unit drives one or more rows of transportation rollers or one or more conveyor belts.

4. The conveying device according to claim 1, wherein one branch conveying mechanism is arranged alternately with one transportation channel.

5. The conveying device according to claim 1, wherein two branch conveying mechanisms are arranged alternately with one transportation channel.

6. The conveying device according to claim 1, wherein in each one of the at least one transportation channel, a plurality of conveyor belts are parallel to each other, and the highest point of rotation of each regular roller and the upper surface of each conveyor belt are in the same plane.

\* \* \* \* \*